E. CLUNEY & C. LEPINE.
Mincing-Machines.

No. 149,640. Patented April 14, 1874.

2 Sheets--Sheet 2.

E. CLUNEY & C. LEPINE.
Mincing-Machines.

No. 149,640. Patented April 14, 1874.

Witnesses:
A. W. Almqvist
C. Sedgwick

Inventor:
E. Cluney
C. Lepine
Per
Attorneys.

UNITED STATES PATENT OFFICE.

EDWARD CLUNEY, OF NEW BEDFORD, AND CHARLES LEPINE, OF BOSTON, MASSACHUSETTS.

IMPROVEMENT IN MINCING-MACHINES.

Specification forming part of Letters Patent No. 149,640, dated April 14, 1874; application filed July 19, 1873.

*To all whom it may concern:*

Figure 1:
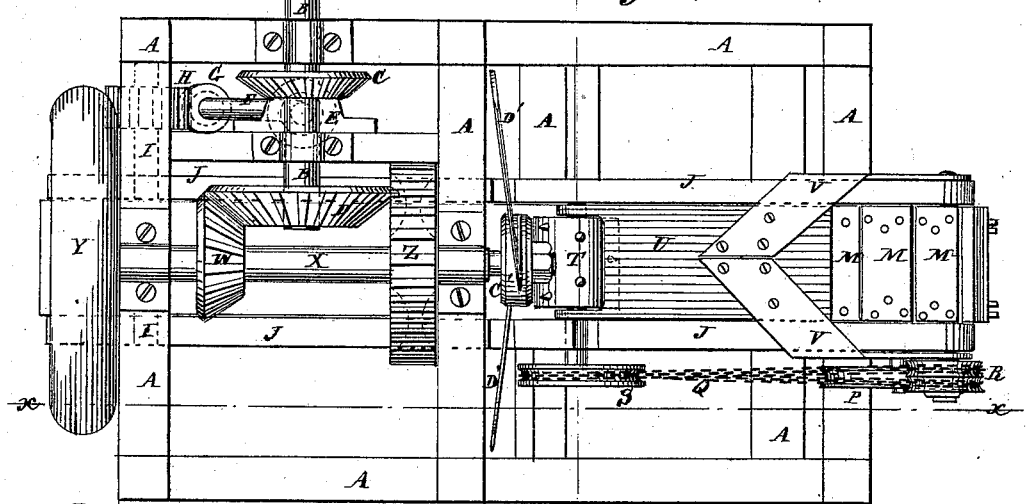
Figure 2:
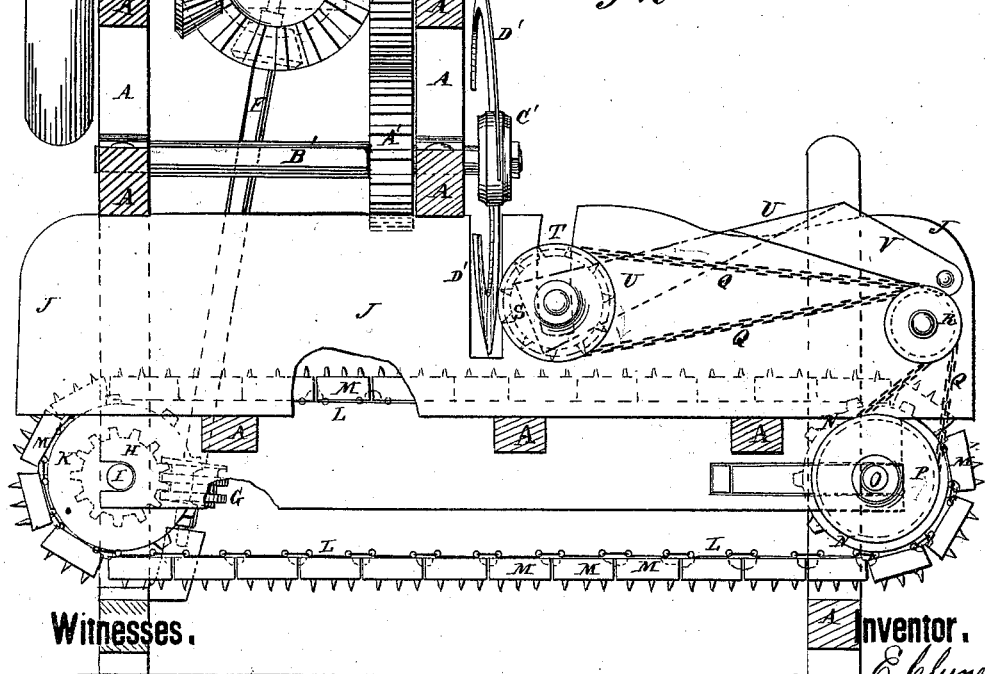
Figure 3:
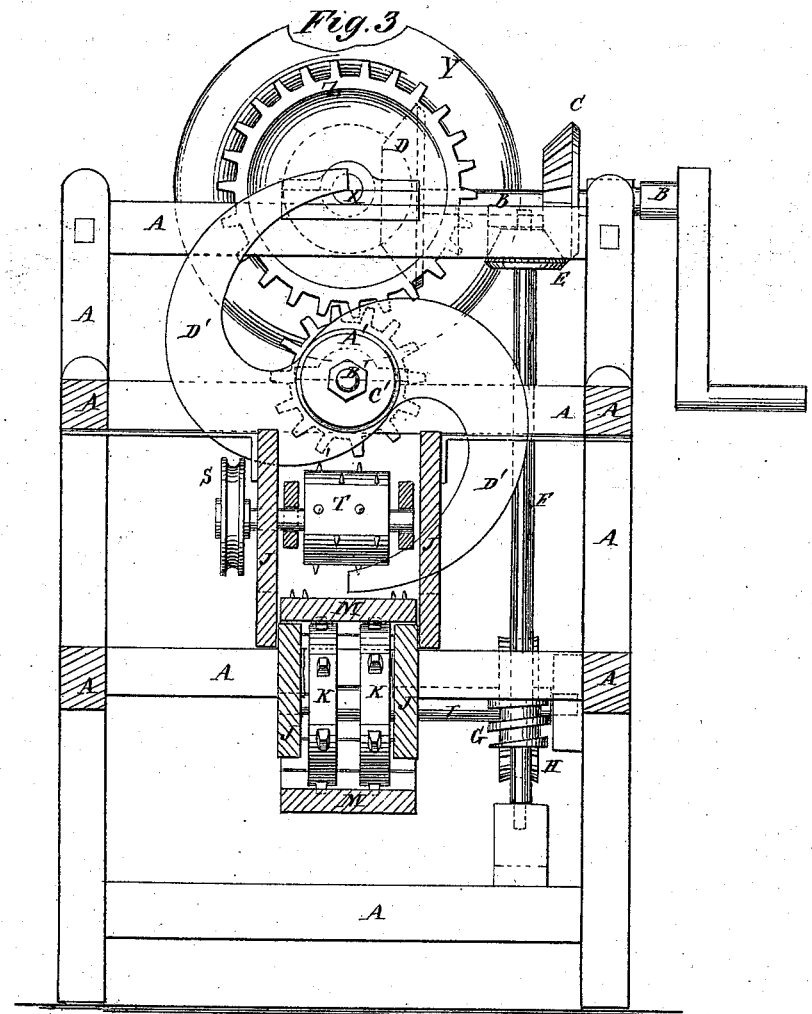
Figure 4:
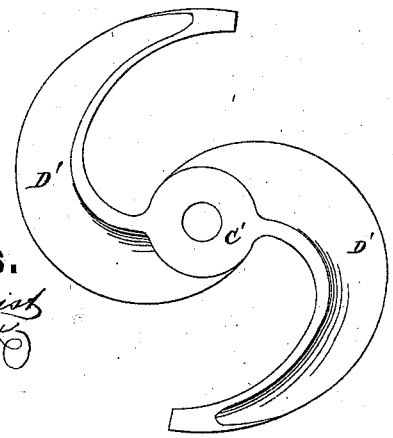
Figure 5:
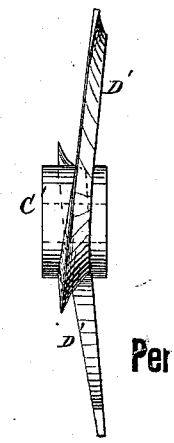

Be it known that we, EDWARD CLUNEY, of New Bedford, Bristol county, Massachusetts, and CHARLES LEPINE, of Boston, Suffolk county, Massachusetts, have invented a new and useful Improvement in Mincing-Machines for Whale-Blubber, of which the following is a specification:

Figure 1, Sheet 1, is a top view of my improved mincing-machine. Fig. 2, Sheet 1, is a vertical longitudinal section of the same, taken through the line $x\ x$, Fig. 1. Fig. 3, Sheet 2, is a vertical cross-section of the same, taken through the line $y\ y$, Fig. 1. Fig. 4, Sheet 2, is a detail side view of the mincing-knives. Fig. 5, Sheet 2, is an edge view of the knives.

Similar letters of reference indicate corresponding parts.

My invention has for its object to furnish an improved mincing-machine for whalers, for mincing or slicing blubber before putting it in the trying-kettles, and which shall be simple in construction, convenient in use, and reliable in operation, being less liable to get out of order than the machines constructed in the ordinary manner.

The invention consists in the carrier and self-adjusting holding device in combination with each other, for feeding the blubber forward to the knives, and in the knives, constructed substantially as herein shown and described, for slicing or mincing the blubber as it is carried forward by the carrier.

A represents the frame-work of the machine, which is designed to be secured to the deck of the whaler. B is the driving-shaft, which revolves in bearings in the upper part of the frame A, and to which motion may be given by hand or other power. To the shaft B are attached two bevel-gear wheels, C D. The teeth of the bevel-gear wheel C mesh into the teeth of the small bevel-gear wheel E, attached to the upper part of the shaft F, which revolves in bearings attached to the frame A, and to the lower part of which is attached, or upon it is formed, a small endless screw, G, the threads of which mesh into the screw-teeth of the wheel H, attached to the end of the shaft I, which revolves in bearings in the carrier-frame J, which is attached to the frame A. To the shafts I, within the carrier-frame J, are attached two chain-wheels, K, around which pass the endless chains L, to which are attached the cross-bars M, that form the endless apron of the carrier. The cross-bars M are placed close together, and are provided with points or prongs to take hold of the pieces of blubber and carry them forward. The endless-chain carrier L M also passes around the chain-wheels N, attached to the shaft O, which revolves in bearings attached to the carrier-frame J. The bearings for the one or the other of the carrier-shafts I O should be adjustable, so that the endless chains may be conveniently tightened or slackened, as required. To one end of the shaft O is attached a pulley, P, around which passes a belt or chain, Q, which passes around the guide-pulley R, pivoted to the carrier-frame J, and around the pulley S, attached to the journal of the cylinder T. The journals of the cylinder T pass through curved slots in the sides of the carrier-frame J, and revolve in bearings in the forward end of the guide U, which becomes gradually thicker toward its forward end, so as to make the space between it and the carrier L M tapering or wedge-shaped, so that the blubber may readily pass beneath the cylinder T, the face of which is provided with spikes, and which holds the pieces of blubber while being cut. To the rear part of the guide U are attached two outwardly-projecting arms, V, which project downward and rearward along the outer sides of the carrier-frame, and are pivoted to said frame a little above and to the rearward of the axis of the guide-pulleys R, so that the chain Q will always be kept taut, whatever be the thickness of the pieces of blubber passing beneath the cylinder T. The teeth of the bevel-gear wheel D of the driving-shaft B mesh into the teeth of the bevel-gear wheel W, attached to the shaft X, which is placed directly above and parallel with the central line of the carrier L M, and revolves in bearings attached to the frame A. To the forward end of the shaft X is attached a balance-wheel, Y, to give steadiness of motion to the machine. To the rear part of the shaft X is attached a large gear-wheel, Z, the teeth of which mesh into the teeth of the smaller gear-wheel A′, attached to the shaft B′, placed below and parallel with the shaft X, and directly above the center line of the carrier L M. To the rear end of the shaft B′ is attached the hub C′, that carries the blades D′. The blades D′ are curved, as shown in Fig. 4, so as to make a shear-cut. The curve of the outer part of the blades D′ is made upon the arc of a circle having its center in the axis of the shaft B′, and without any cutting-edge, so that as the blades are dulled and reground the cutting-edge may extend out farther and farther, and always terminate at the same distance from the shaft B′ and carrier L M. The blades D′ are also curved or twisted spirally, as shown in Figs. 1, 2, and 5, to correspond with the rapidity of feed, so that the cutting-point of the blades may move forward as the piece of blubber being operated upon by the said blades is carried forward. The shaft B′ is so arranged in connection with the carrier that the blades D′ will cut the slices of blubber not quite off, enabling the blubber to be handled with forks.

Having thus described our invention, we claim as new and desire to secure by Letters Patent—

1. The carrier K L M and self-adjusting holding device T U V, in combination with each other, for carrying the blubber forward to the knives, substantially as herein shown and described.

2. The blades D′, curved or sickle-shaped, and arranged spirally on the shaft, as and for the purpose specified.

3. The combination of the blades D′, constructed and arranged as specified, with the carrier K L M and self-adjusting holder T U V, as shown and described, for the purpose set forth.

EDWARD CLUNEY.
CHARLES LEPINE.

Witnesses:
EMORY B. SMITH,
GEO. L. BIRKMAIN.